(12) United States Patent
MacKenzie et al.

(10) Patent No.: US 6,363,495 B1
(45) Date of Patent: Mar. 26, 2002

(54) METHOD AND APPARATUS FOR PARTITION RESOLUTION IN CLUSTERED COMPUTER SYSTEMS

(75) Inventors: Kenneth Bruce MacKenzie; Richard James McCarty; Amal Ahmed Shaheen, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/232,243

(22) Filed: Jan. 19, 1999

(51) Int. Cl.[7] ............................................. G06F 11/00
(52) U.S. Cl. ................................ 714/4; 714/37
(58) Field of Search .................... 714/4, 43, 1, 798, 714/37; 709/201, 203, 215, 400; 707/102; 710/100, 104; 711/147; 370/245, 254

(56) References Cited

U.S. PATENT DOCUMENTS

| | | | |
|---|---|---|---|
| 3,921,149 A | 11/1975 | Kreis et al. | 340/172 |
| 3,932,847 A | 1/1976 | Smith | 340/172 |
| 4,853,843 A | 8/1989 | Ecklund | 364/200 |
| 4,920,487 A | * 4/1990 | Baffes | |
| 5,548,743 A | 8/1996 | Sugiyama et al. | 395/479 |
| 5,612,865 A | 3/1997 | Dasgupta | 364/184 |
| 5,634,011 A | * 5/1997 | Auerbach et al. | |
| 5,699,500 A | 12/1997 | Dasgupta | 395/180 |
| 5,717,950 A | 2/1998 | Yamaguchi et al. | 395/828 |
| 6,098,179 A | * 8/2000 | Harter, Jr. | |

* cited by examiner

Primary Examiner—Gopal C. Ray
(74) Attorney, Agent, or Firm—Duke W. Yee; Jeffrey S. LaBaw; Michael R. Nichols

(57) ABSTRACT

A method in a computer for handling a network partition of a clustered computer system, wherein the computer is part of a number of computers located within the cluster. Data is periodically written into a data structure in a shared resource, wherein the data provides a status of the computer and wherein a data structure is associated with each cluster node. Monitoring for a partition of the cluster is performed. All data structures located in the shared resource are read in response to detecting a network partition of the cluster. A determination is made as to whether the computer is in the preferred partition, one containing the largest number of computers or is otherwise determined to be viable for continued operation. Should the computer determine that it is not a member of a preferred or otherwise viable partition, it must relinquish access to shared cluster resources requiring mutually exclusive access, such as a database on a shared disk volume. This is generally effected by the computer ceasing to operate as an active member of the cluster.

35 Claims, 11 Drawing Sheets

METHOD AND APPARATUS FOR PARTITION RESOLUTION IN CLUSTERED COMPUTER SYSTEMS

BACKGROUND OF THE INVENTION

1. Technical Field

The present invention relates generally to a distributed data processing system and in particular to a method and apparatus for managing a server system within a distributed data processing system. Still more particularly, the present invention relates to a method and apparatus for handling network communication failures among servers within a distributed data processing system.

2. Description of Related Art

Multiple computers may be employed to increase performance of a computing site or to avoid problems associated with single computer failures. These computers are used to form a cluster, which is also referred to as a clustered computer system. An individual computer within a cluster is referred to as a cluster server, cluster member, or cluster node.

Generally, cluster nodes communicate with each other over a network. If a network communication failure occurs, the cluster may be partitioned into two or more parts. If cluster servers in a partition are unable to determine the status of cluster servers outside of the partition, continued application processing may result in a condition referred to as split-brain operation. To a subset A of cluster nodes, it is unclear whether the node(s) in some other subset B are actually operational or are simply unable to communicate with subset A. Such a situation is dangerous, as it can result in corruption of data maintained by the cluster or incorrect processing results.

For example, if a clustered computer system, containing two cluster nodes, is partitioned by severing links which are used for cluster communication between the nodes, each node will be unable to determine the state or status of the other. Further, any mutual exclusion mechanisms which depends on the severed link(s) will be inoperable or will yield incorrect results. This can result in both nodes deciding that it is proper to control a resource which is only safely controlled by one node at a time. Such a condition can result in corrupted data or incorrect processing results. A common example of such a resource is a file system residing on a disk connected to both nodes.

Corruption of a shared database is the most common manifestation of split-brain operation, though certainly any mutually-accessible resource may be affected. So more specifically, split-brain operation would be defined as a condition involving two or more computers in which mutually-accessible resources are not under the control of any mutual exclusion mechanism.

Clearly, to avoid a split-brain condition, mutual exclusion mechanisms must be preserved. Traditionally, high-availability systems have relied on various methods to minimize the probability of a split-brain condition. These include such things as redundant communication links and deadman timers. Each of these mechanisms has its strengths and weaknesses. Because of this, it is common for multiple links and methods to be used concurrently.

Redundant communication links are commonly used for split-brain prevention. These include such things as secondary network links, asynchronous (TTY) links, or device-bus links (of which target-mode SCSI is an example). A common use of a redundant link is to provide what is known as a heartbeat capability. Generally, a heartbeat operation is nothing more than an ongoing sequence of messages from one communication endpoint. (a sender) to one or more other endpoints (receivers) which indicate to the receiver(s) that the sender is operational. These messages are commonly referred to as "I'm alive" messages. A heartbeat exchange occurs when these communication endpoints pass heartbeat messages bi-directionally, indicating the "liveness" of all participating endpoints. In the event of a primary communication failure, this heartbeat mechanism over the redundant link(s) permits an endpoint to know that another endpoint remains active despite an inability to participate in normal cluster communication. Generally, this information is used as a fail-safe to ensure that resource control errors of the type described earlier do not occur.

If a redundant communication link is only used as a heartbeat mechanism, then it provides the cluster node with only enough information to determine that an unsafe condition may exist in which it would be potentially dangerous to take over certain resources. A heartbeat alone may not indicate the exact nature of the condition or reveal information sufficient to recover from it. However, it is sufficient to assure that a cluster node can recognize the existence of an unsafe condition with respect to resource control and take no action which might compromise resource integrity. This is the approach commonly taken. If an unsafe condition with respect to a cluster node is seen, do not attempt to take over any processing resources which may already be under control of that node. It is Better to do nothing than risk the consequences of a mistake.

For example, assume a two node system sharing a disk. The disk contains a database which may only be controlled by one node at a time. A mutual exclusion mechanism in the form of a lock manager operates over a primary network link to assure that only one node updates the database at a time. A heartbeat mechanism operates over a secondary network link. Should the primary link be disabled, negotiation for database access through the mutual exclusion mechanism will also be disabled. However, should the secondary link remain active and heartbeat communication continue to be received, a cluster node will at least be able to recognize the fact that the other cluster node remains active and it would be unsafe to acquire control of the database. This example should only be viewed as illustrative. The mechanisms described are also applicable to clusters of greater than two nodes.

It should be pointed out that while use of a redundant heartbeat link can allow a node to recognize the existence of an unsafe condition, it cannot guarantee recognition of a safe condition. Referring to the previous example, if both the primary and secondary links were to fail, a cluster node would not be able to determine the true nature of the failure. One possibility is that the communication links are intact but the other node has itself failed and is no longer sending messages. Another is that the links have both failed and the other node remains operational but unable to communicate that fact. This points out the essential problem in preventing split-brain operation. It is impossible to guarantee safety of operation against shared resources in the absence of a functioning mutual exclusion mechanism. The best one can do is minimize the probability of accessing such resources under unsafe conditions.

Because of this need to minimize the probability of interpreting an unsafe condition as safe, it is often important not only to utilize multiple links concurrently, but also for those links to be of different types. Further, for each type, the hardware, processing algorithm and operating system code path (communication stack) should be as different as possible. This reduces the possibility of encountering single points of failure within the hardware or operating system.

Generally, primary communication among cluster nodes occurs using higher performance network links, such as Ethernet, FDDI, or Token-Ring. Often, backup links utilizing one of these or a similar mechanism are used to provide cluster communication should the main link fail. Such backup links are helpful as secondary links for split-brain prevention; however, they may not be as reliable as other link types if they share code paths in common with the primary link(s). An example of this would be the TCP/IP communications stack in the operating system. Further, should a backup link take over primary communication, it is no longer useful as a secondary link.

One or more secondary links for split-brain prevention should be of a different type than the primary, both in hardware and operating system code path. For illustrative purposes, there are two commonly used secondary communication mechanisms of note for split-brain prevention—asynchronous (TTY) links and target-mode SCSI.

Use of an asynchronous TTY link to provide a redundant heartbeat connection is a common feature of most failover High-Availability (HA) clustering implementations. When the link transport is done using a different communications stack than regular cluster communication and the associated process(es) run at an appropriate priority, this can be a very reliable method of split-brain avoidance, especially when some amount of cluster state (for example, the list of applications a node thinks it "owns") is also passed along in the heartbeat messages.

Topology issues arise with async links when the cluster expands beyond two nodes. Suddenly we are faced with having to either have N—1 connections per node, or must use some sort of ring topology with two connections per node. We also have an issue of needing to reconfigure the link topology when nodes are added or removed (especially so in the N–1 connections case).

Another problem that occurs as the cluster size grows is one of maintaining proper communication synchronization. For example, with more nodes, more heartbeat messages are in-process simultaneously, increasing the difficulty in maintaining heartbeat timings.

Finally, there are subtle portability issues associated with TTY code in general—async implementations vary widely in their behavior and are particularly susceptible to driver/hardware idiosyncrasies.

Target mode SCSI is another redundant link alternative which has been used in HA failover cluster implementations. From a high-level perspective, one can think of it as being similar in use to async tty heartbeat links, except that all parties are connected via a common device bus, in this case SCSI. The communication is, however, point-to-point as in async tty. Basically, the SCSI bus is used as a "back-channel" communication path between nodes connected to the bus. In addition to any system to device communication over the bus (such as to a disk), there are also system to system heartbeat exchanges.

Target-mode SCSI depends on the same hardware/driver support required for shared SCSI disk. As long as all cluster nodes require shared disk for their application, this approach does not require anything additional for it to work, other than an appropriate heartbeat daemon at each node and of course the operating system support to allow such communication on the bus.

One issue with target-mode SCSI in high volume disk I/O environments is that node to node communication can often be delayed by bus contention issues, resulting in "false-positives" (deciding incorrectly that an endpoint is non-operational) if proper safeguards are not followed (adequate time-outs, etc.). As the number of active point to point links over the bus increases, the problem becomes more of a factor.

Deadman timers are another method for preventing split-brain operation. Basically, a deadman timer is a one-way heartbeat mechanism, rather than an exchange among two or more end-points. A deadman has a control point which receives messages, and a sending point which provides messages. If the control point does not receive a message from the sending point within some established time period, it will assume that the sending point is non-operational and will take corrective action. Many deadman mechanisms utilize hardware assists.

For example, there are computer systems containing Service Processors, which operate deadman timers. These processors are capable of stopping or restarting the main processor. Should the main processor fail to provide a message to the deadman timer within a given time period, the service processor will consider the computer system to be non-operational and may effect a shutdown, restart, or other appropriate action. This may prevent corruption of data in a clustered computer system when a node becomes unable to respond and participate in cluster operation.

Though existing methods can provide a high degree of split-brain prevention, certain problems remain. First, the mechanisms are often not directly tied to the critical shared resource(s). Clearly, the better one is able to assure that should the split-brain mechanism fail, the critical shared resource must also fail, the better one can assure that a split-brain condition cannot occur, at least with respect to that resource. Second, without N to N connectivity for split-brain prevention, it is difficult, often impossible, for a cluster node to recognize more than the fact that an unsafe condition is present. Also, certain multiple-node failure scenarios remain problematic.

SUMMARY OF THE INVENTION

A clustered computer system, or more simply "a cluster" is a set of computers (also called servers or nodes) that are connected to communication networks and often shared devices to allow the set of computers to interact in a coherent manner. The nodes are said to be cluster members, cluster servers, or cluster nodes. The network allows the nodes to send and receive messages.

For the purposes of this invention, the nodes in the cluster are also connected to one or more shared storage resources, typically shared disk devices. During normal operation, programs running on each node will read and write data to the shared device(s). These data accesses from different nodes must be coordinated to prevent unintended or uncontrolled overlays of the data. This coordination is often achieved by sending messages among the nodes over the network and utilizing an appropriate mutual exclusion mechanism, for example, a lock manager.

If a cluster node fails, it can no longer write data to the shared device(s). Therefore, it cannot affect the integrity of the data on the shared device(s). Other cluster nodes can continue to access the shared device(s) and maintain the integrity of that data. This is possible because the non-failing nodes or "surviving nodes" can continue to coordinate their data accesses by communicating over the network. If the computer network fails, the normal coordination mechanism is disrupted, and the integrity of the shared data is jeopardized.

A failure of the network may cause two or more groups of nodes to be isolated from each other, where members of one group cannot communicate over the network with members of any other group. These different groups can no longer effectively coordinate their accesses to the shared data. Indeed, one group may believe that the other group has terminated altogether. These different groups of network-connected nodes are called cluster partitions. If nodes in more than one cluster partition were to continue writing data to the shared disks, the data may easily become corrupted. Such a condition is known as split-brain operation.

To prevent the loss of data integrity from split-brain operation, it is necessary to prevent multiple cluster partitions from continuing to access the shared data. It is equally important to prevent a single node that is not connected to the cluster network from starting up and accessing the shared data, in effect forming its own cluster partition.

The present invention provides a method in a computer for handling such partitions of a clustered computer system. The invention provides a mechanism for prevention of split-brain operation in the event of a network communication failure between any subset of the cluster nodes.

Further, the invention provides enhancement over existing split-brain prevention mechanisms in that it permits each cluster node to determine the true membership of the cluster in the absence of primary cluster communication and to resolve the network partition optimally. This allows cluster nodes to not only determine whether an unsafe condition exists, but also to effect actions which will correctly bring about a safe condition and allow resource control to be established and processing to continue among a subset of the cluster nodes.

The present invention includes a computer implemented method for preventing split-brain operation. It includes the ability to both recognize the existence of a partitioned cluster condition and to resolve the partition to permit continued operation, the method including the steps of: maintaining cluster state information on a shared storage device, such as a disk; utilizing this data to determine the cluster communication connectivity as seen by each cluster node; making a determination of the desired cluster membership in the event of a network partition; and effecting the desired cluster membership by voluntarily leaving the cluster or taking other action as required.

In the preferred embodiment detailed in the following more particular description of the invention, software components running on each node are used to detect node or network failures within the cluster. Portions of a shared disk are assigned to be used as a secondary communication link among the cluster nodes. Data in these portions of the shared disk will identify the cluster nodes and indicate each node's ability to communicate with other nodes over the network. When a node or network communication failure is detected, each node will independently write new data to the disk, read the data written by the other nodes, calculate statistics about any cluster partitions that have been formed, and should a cluster partition be identified, decide on an action the node should take to resolve it.

It is therefore an object of the present invention to provide the ability for cluster nodes in a clustered computer system to determine the existence of a safe or unsafe condition for control of shared resources, even in the event of such degenerate cases as an N-way failure of primary cluster communication.

It is yet another object of the invention to permit successful resolution of a network partition disabling cluster communication among subsets of the cluster nodes by establishing which subset(s) may safely control shared resources.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
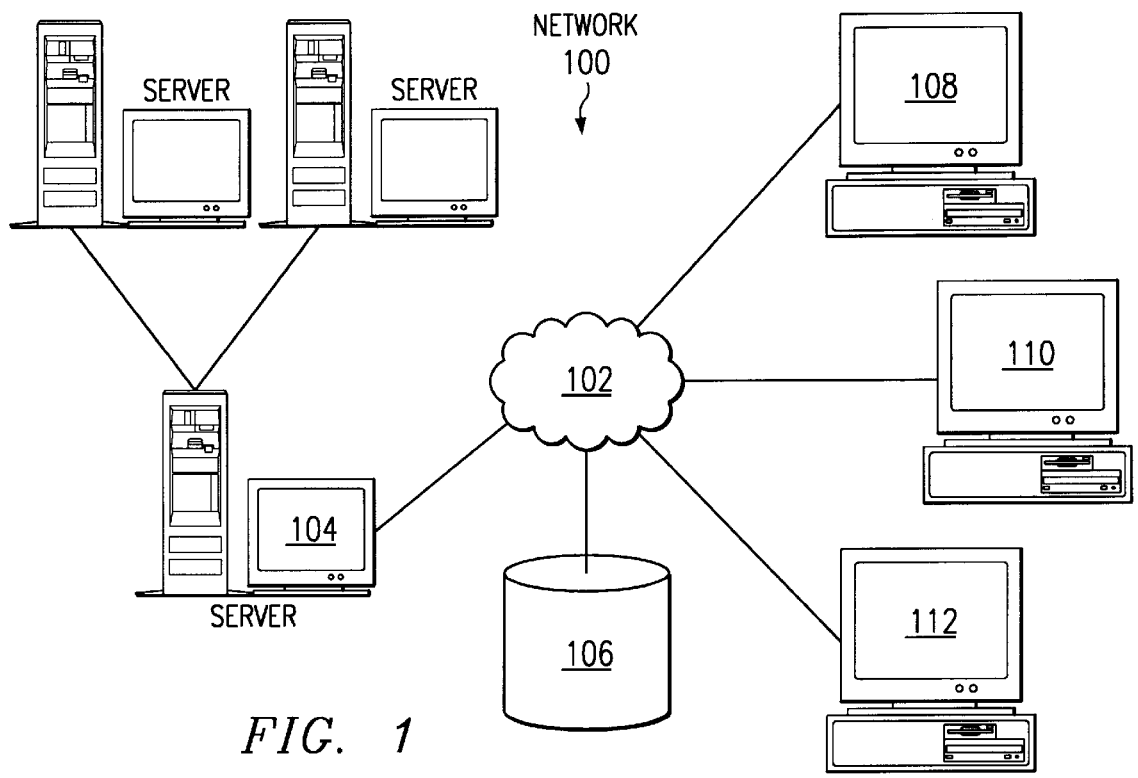
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a computer server system 104 is connected to network 102 along with storage unit 106. In the depicted example, computer server system 104 is a clustered computer system that contains two or more computer servers connected to each other. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, computer server system 104 provides data, such as, for example, boot files, operating system images, and applications to clients 108–112. Clients 108, 110, and 112 are clients to computer server system 104. Distributed data processing system 100 may include additional servers, clients, and other devices not shown. The processes of the present invention are implemented within computer server system 104 to enable computer server system 104 to continue servicing clients, such as clients 108–112 in the event of a partition within computer server system 104.

In the depicted example, distributed data processing system 100 uses a network for communication among the various components. The network can be implemented using a variety of protocols. This invention is not dependent upon any specific protocol.

FIG. 1 is intended as an example, and not as an architectural limitation for the processes of the present invention.

Figure 2:
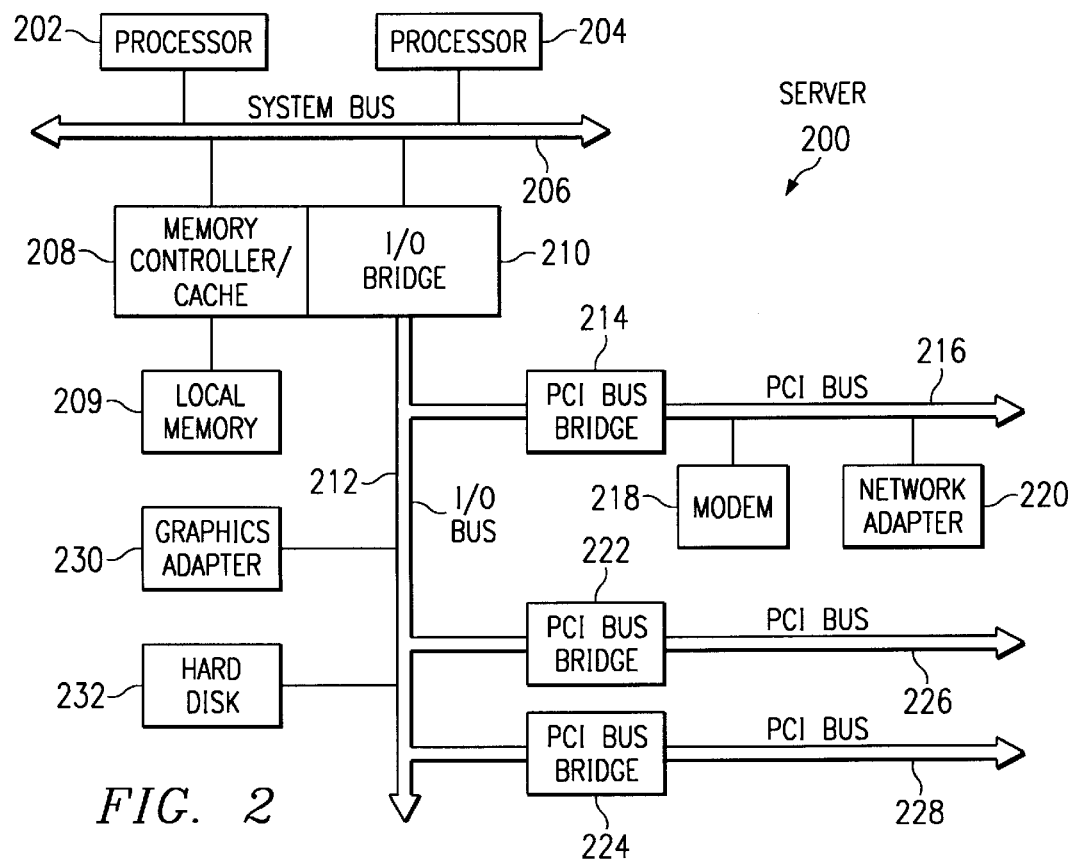
FIG. 2 is a block diagram of a data processing system, which may be implemented as a computer, server, or node.

Referring to FIG. 2, a block diagram of a data processing system, which may be implemented as a server within clustered computer system 104 in FIG. 1, is depicted in accordance to the present invention. The process of the present invention may be implemented within server 200. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus .212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

A number of servers, such as server 200, may be connected to each other to form a clustered computer system, such as cluster system 104.

Figure 3:
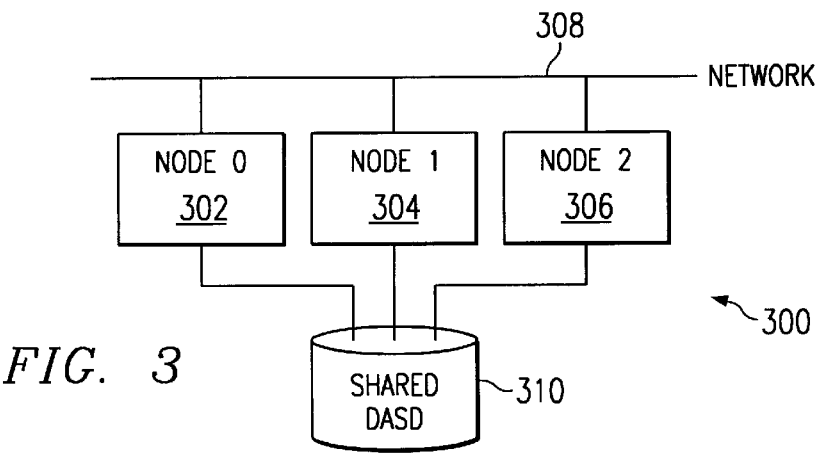
FIG. 3 is a diagram of a cluster in accordance with a preferred embodiment of the present invention.

FIG. 3 depicts a clustered computer system with three nodes, a network connecting each of the nodes, and some shared dasd in accordance with a preferred embodiment of the present invention. The nodes are numbered consecutively from 0 through N—1. The node numbers are used in later processing to represent which computers are present within the cluster. Each node uses the network to periodically send messages to the next sequentially numbered node. These messages are referred to as network heartbeats. The failure of a node or of the network will prevent a node's network heartbeats from being received by another node. This signifies that a failure has occurred which must be analyzed in case cluster partitioning has occurred. Each node is assigned specific physical disk blocks on the shared dasd. This allows each node to write its data atomically without interference from other nodes.

In FIG. 3, the clustered computer system 300 includes three nodes, node 302, node 304, and node 306, which are connected to each other by a communications link in the form of network 308. A shared resource in the form of a direct access storage device (DASD) 310 is present in clustered computer system 300 and is connected to nodes 302–306.

The present invention provides a method, apparatus, and instructions for managing and resolving cluster partitions within a clustered computer system. In particular, cluster partitions resulting from network communication failures are detected. Resolution of cluster partitions is performed using a shared resource, such as DASD 310, which is used to store information about the nodes which are members of the cluster. This information may be stored on the dasd using specific numbered dasd blocks or by using some other type of mechanism. When a cluster partition is formed, normal accessing of the shared data is suspended until the cluster partitioning is resolved. Depending on the implementation, more than one cluster partition may be allowed to continue to operate.

Figure 4:
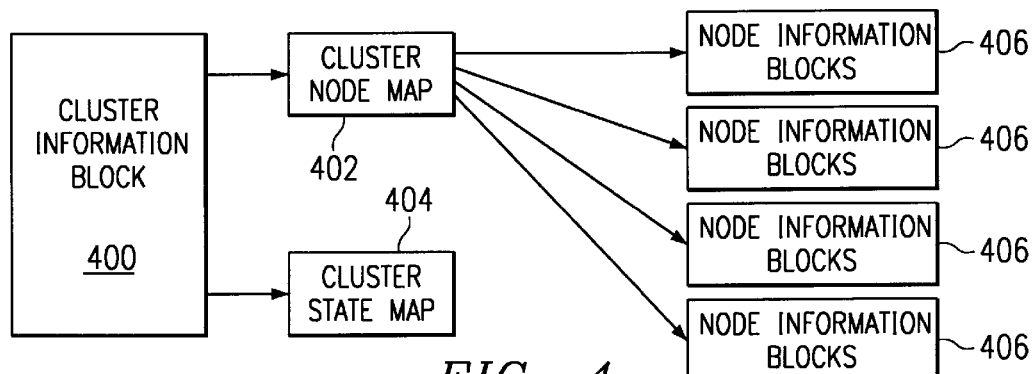
FIG. 4 is a diagram of shared disk data structures used for cluster partition resolution in accordance with a preferred embodiment of the present invention.

FIG. 4 depicts the general layout of the data blocks written to the shared disk for the purposes of detecting if cluster partitioning has occurred and for determining the actions to resolve it, in accordance with a preferred embodiment of the current invention. In the figure, the data structures include a cluster information block (CIB) 400, a cluster node map (CNM) 402, a cluster state map (CSM) 404, and node information blocks (NIB) 406. The data blocks are defined so as to allow flexibility in their placement on the shared dasd. The blocks do not need to be physically contiguous and more blocks can be added to accommodate more nodes in the cluster. The CIB (400) contains header information and disk block numbers for the CNM (402) and the CSM (404). The purpose of the CIB is as an anchor block for the other blocks. The CNM (402) contains disk block numbers for the NIBs (406). The purpose of the CNM is to allow the NIB blocks to reside non-contiguously on the shared disk and to add more NIBs if more nodes are added to the cluster. The CSM (404) contains information about the current cluster node membership. The CSM data is said to be the "official" or "master" view of the cluster node membership. The CSM is updated every time a node joins or leaves the cluster. The NIB (406) represents a node's disk heartbeat. It contains cluster node membership information as viewed by a particular node. When a node becomes a member of a cluster, information about the node is recorded in these blocks and to the CSM 404. Additionally, the new cluster member node is assigned a block on the disk for its NIB (406) and is responsible for writing that block to the disk periodically. This periodic writing of a NIB is called "disk heartbeating" and the NIB itself is called the "disk heartbeat". Each node will have a dedicated NIB, such as NIB 406 located in a physical disk block. A NIB can be easily contained in a single physical disk block. As a result, it is possible to guarantee atomicity of all NIB reads and writes.

During cluster initialization, one node will write each of these blocks to a designated area of the shared disk. At all other times, a node only writes its own NIB. During cluster partition resolution, a node will read other NIBs. The set of valid NIBs is defined by CNM 402, which contains physical disk block offsets to them. CNM 402 normally is only written during cluster initialization, but if CNM 402 needs to be updated during cluster operation, an appropriate mutual exclusion mechanism must be used to prevent different nodes from trying to update the block simultaneously. CNM 402 may span multiple disk blocks.

FIG. 5 depicts the shared disk data blocks in more detail. The CIB and CNM blocks are static in the sense that they are normally written just once when the shared disk is first initialized for use by the cluster partition resolution processes. The CSM and NIB blocks are dynamic in the sense that they are modified periodically after the disk initialization is complete. Actions such as a node joining a cluster (starting to actively participate in the clustered computer system), leaving a cluster, or resolving a cluster partition will all cause the CSM and NIB blocks to be modified. The CSM contains data that represents the "master view" of the cluster node membership. That is, it identifies nodes that have properly joined the cluster. Every time a node joins or leaves the cluster, the node membership data in the CSM is updated. At the same time, a sequence number called the cluster generation number in incremented. The cluster generation number therefore indicates which version of the membership data the CSM contains. Similarly, each NIB contains data that represents that node's view of the cluster node membership. During normal operations, the node membership in the CSM and the NIBs will be the same. The NIB also contains a cluster generation number that indicates the version of the cluster membership data that the node has written to the disk. Any time a node writes a NIB with different node membership data, the cluster generation number in the NIB will be incremented. This allows other nodes to determine if a node has written new information in its NIB.

Figure 5A:
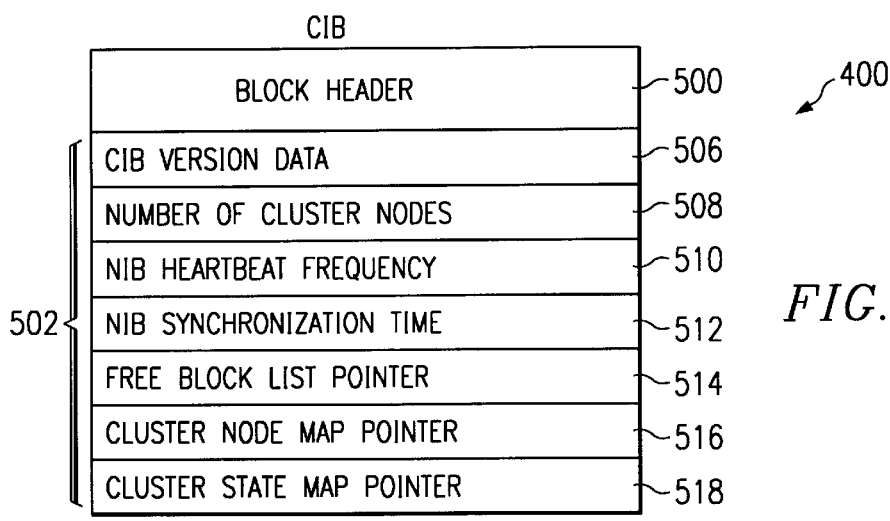
FIGS. 5A–5D are detailed diagrams of shared disk data structures from FIG. 4 in accordance with a preferred embodiment of the present invention.
Figure 5B:
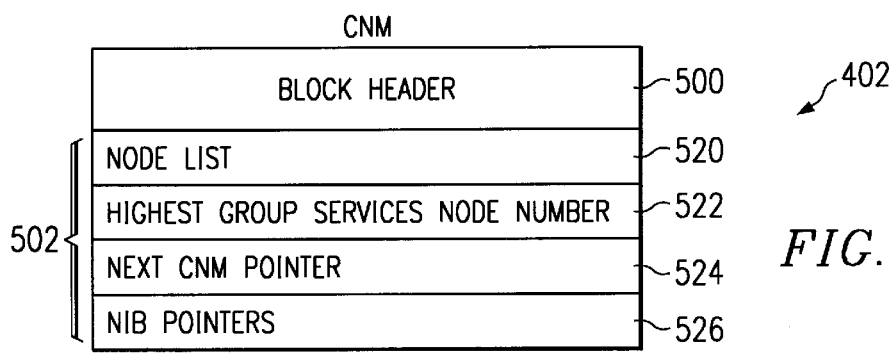
Figure 5C:
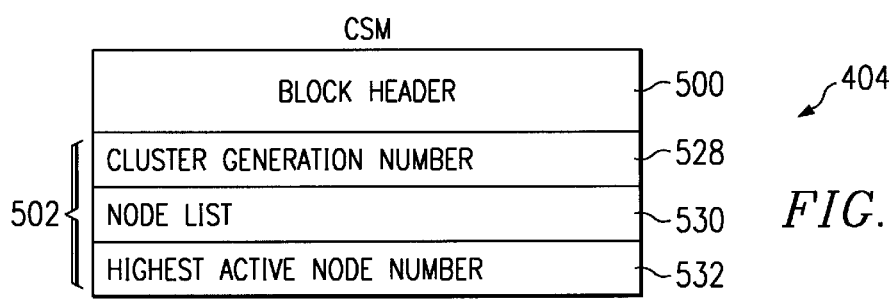
Figure 5D:
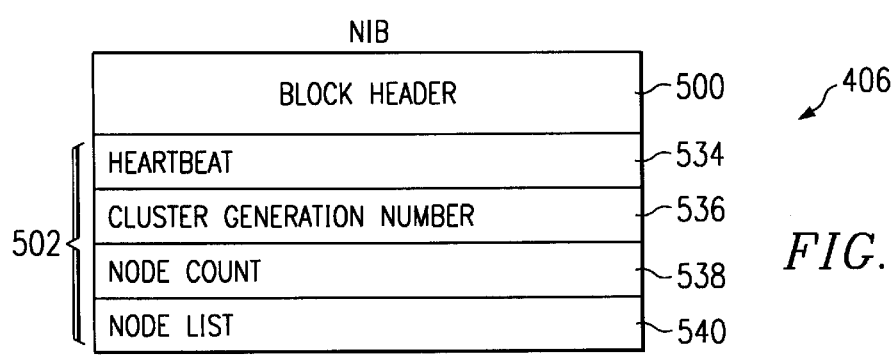

With reference now to FIGS. 5A–5D, more detailed diagrams of data structures from FIG. 4 are depicted in accordance with a preferred embodiment of the present invention. The data structures illustrated in FIGS. 5A–5D each includes a block header 500 and a data area 502. Block header 500 is the same for each of the data structures while data area 502 is dependent on the type of data structure. In the depicted example, block header 500 is 48 bytes and contains a block type code, version information, data area length, and an optional block check sum/CRC data. Of course, block header 500 may contain other information as appropriate. Data area 502 begins immediately following block header 500 and has a length that is specified by block header 500. In FIG. 5A, CIB 400 is the root data structure and provides an anchor block for the other data structures. In the depicted example, only a single CIB 400 is present for a clustered computer system. This data structure contains basic cluster information and pointers to other data structures. CIB 400 includes CIB version data field 506, which indicates the version of CIB 400. Number of cluster nodes field 508 contains the number of nodes or servers that are associated with a particular clustered computer system. NIB heartbeat frequency field 510 indicates the frequency of heartbeat signals in seconds. NIB synchronization time field 512 provides synchronization time in seconds. Free block list pointer 514 is a pointer to additional fields in data area 502, which are currently unused and which may be allocated at some future point in time. Cluster node map pointer 516 is a pointer to a CNM 402, while cluster state map pointer 518 is a pointer to a CSM 404. In FIG. 5B, CNM 402 contains a list of all possible nodes that can be cluster members. In addition, CNM 402 provides pointers to various NIBs 406. This data structure also allows for noncontiguous allocation of NIBs 406. A single CNM 402 is used for each clustered computer system. In the depicted example, CNM 402 is updated when the clustered computer system is first initialized. It can also be updated during normal cluster operations. Such updates would need to be serialized among the cluster member nodes using an appropriate mutual exclusion mechanism. CNM 402 includes a node list 520, a highest node number field 522, a next CNM pointer 524, and NIB pointers 526. Node list 520 in the depicted example is a bit map indexed by node number showing which nodes are configured in the cluster. Highest node number 532 is the last node whose NIB pointer is contained in this CNM. This minimizes search time for a particular NIB pointer if multiple CNM blocks are present. Next CNM pointer 524 is a pointer used to point to the next CNM block in the instance in which the cluster node map spans multiple data structures. NIB pointers 526 are pointers to the NIB data structures. In FIG. 5C, CSM 404 provides a dynamic view of a clustered computer system. This data structure includes a map of cluster nodes, which are members of the active partition. This data structure is updated when the membership in a clustered computer system changes. CSM 404 includes a cluster generation number field 528, a node list 530, and a highest active node number field 532. Cluster generation number field 528 contains a sequence number, which is updated when the membership in the clustered computer system changes. Node list 530 is a list of the operational nodes and in the depicted example is a bit map indexed by node number. Highest active node number 532 contains the last node number represented in the node list 530. This is used to minimize search time through the node list 530. Next in FIG. 5D, NIB 406 is used to hold the current state of the cluster as viewed by individual nodes in a clustered computer system. NIB 406 contains heartbeat field 534, cluster generation number field 536, node count field 538, and node list 540. Heartbeat field 534 contains a timestamp value which is written by the node associated with NIB 406. Cluster generation number field 536 contains a sequence number, which is updated when the membership in a clustered computer system changes. Node count field 538 contains a value identifying the number of supported nodes in a clustered computer system. Node list 540 contains a list of operational nodes and is in the form of a bit map in the depicted example.

Figures 6, 7:
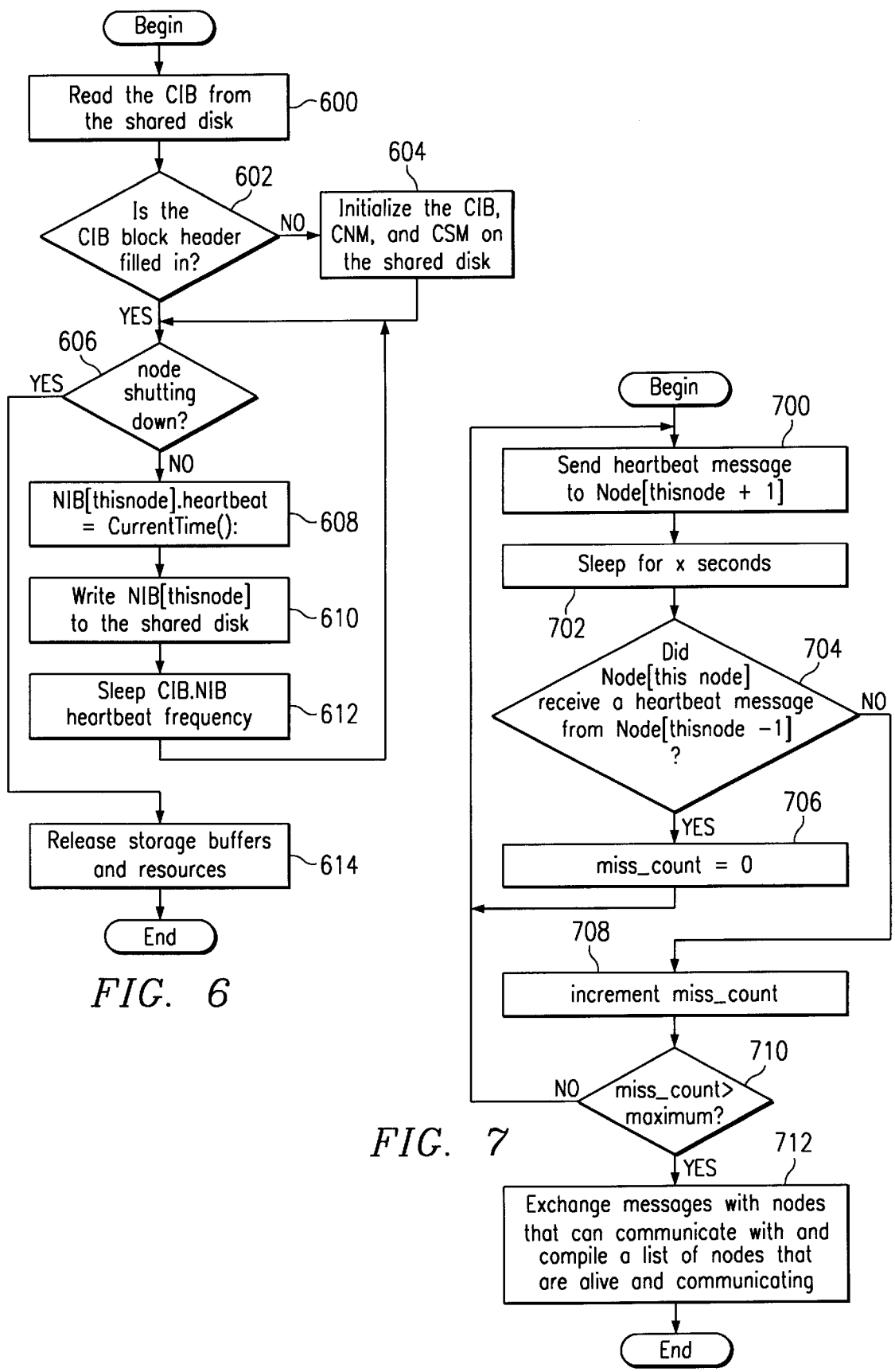
FIG. 6 is a flowchart for writing data to the shared disk for the purpose of resolving a cluster partition in accordance with a preferred embodiment of the present invention.
FIG. 7 is a flowchart of a process for sending network messages between nodes for the purpose of detecting node and network failures in accordance with a preferred embodiment of the present invention.

Refer now to FIG. 6. When a cluster is first started, the shared disk blocks used for cluster resolution must be initialized. When a node joins a cluster, a process must be started on that node that prepares the node to participate in subsequent cluster partition resolution processing. In particular, each node must periodically write its NIB block to its assigned location on the shared disk. FIG. 6 depicts a process for performing these tasks, in accordance with a preferred embodiment of this invention. The periodic writing of the NIB block to the shared disk is called "disk heartbeating". Each node writes a block of data that can be read by the other nodes. This process continues until the node no longer chooses to participate in the cluster or is otherwise shut down. For purposes of this embodiment, a shut down is intended to identify a process by which a node ceases to participate as an active cluster member.

FIG. 6 is a flowchart of a shared disk heartbeat routine. This process is used by each node in a clustered computer system and is initiated when a node joins a clustered computer system. The node writes data to its NIB periodically. With each write or "disk heartbeat", the NIB timestamp number is incremented. Additionally, a bit map of the cluster node membership as seen by the node is written. The disk heartbeat frequency is the same for all nodes and is defined in the CIB. For example, a frequency of five seconds per write may be used. The process begins by reading a CIB from the shared disk (step 600). A determination is made as to whether the CIB field name is present (step 602). If the CIB field name is not present, the CIB, a CNM, and a CSM are initialized on the shared disk (step 604). Thereafter, the process enters a loop until the node determines to shut down or otherwise cease to operate as a cluster member (step 606). This step also is executed from step 602 if the CIB name field is present. If the node is not shutting down or otherwise leaving the cluster, the timestamp for the node is set equal to the current time (step 608), and the NIB is written to the shared disk (step 610). Thereafter, the process sleeps for a period of time set by the CIB.NIB heartbeat frequency (step 612) and returns to step 606. When the node is shutting down or otherwise leaving the cluster, storage buffers and resources are released (step 614) with the process terminating thereafter.

Refer now to FIG. 7. This invention relies on a mechanism for detecting node or network failures within the cluster. This is typically done with a process running on each node that periodically sends a small message over the network to an adjacent node. These messages are referred to as "network heartbeats". FIG. 7 depicts an example of how such a failure detection mechanism can be implemented. This process is not part of this invention, but is a supporting process. This figure shows a flowchart of a process for detecting network failure is depicted in accordance with a preferred embodiment of the present invention. The process of FIG. 7 is executed on each node in a clustered computer system. Each node sends a message to the next higher numbered node and receives a message from the next lower numbered node forming a ring. The process begins by sending a heartbeat message from the node on which the process is executing to another node, Node[thisnode +1] (step 700). Thereafter, the process sleeps for a selected period of time (step 702). A determination is then made as to whether the node has received a network heartbeat message from another node, Node[thisnode −1] (step 704). If a heartbeat message was received, then a variable miss__count, used to count missed heartbeat messages, is set equal to 0 (step 706) with the process then returning to step 700. Otherwise, the variable miss__count is incremented (step 708). A determination is then made as to whether the variable miss__count is greater than a maximum number (step 710). The maximum number in step 710 is employed as a threshold to determine when a conclusion that a node has failed or lost connectivity is to be made. If miss__count is not greater than the maximum number, the process returns to step 700. On the other hand, if the variable miss__count is greater than the maximum number, messages are exchanged with nodes that can communicate with the node on which this process is executing and a list of nodes that are alive and communicating is compiled (step 712) and made available to the cluster partition methods. (See step 806 in FIG. 8 below). The process illustrated in FIG. 7 is exemplary and not intended to limit the manner in which network failures may be detected. Other mechanisms may be employed. For example, node or network failures may be detected by scanning all NIBs to determine which nodes are performing disk heartbeats, with the contents of the NIB indicating the nodes with which it has network connectivity. Discrepancies in bit maps containing the node list will reveal the existence of cluster partitions within the clustered computer system.

FIGS. 8–12 are flowcharts illustrating a process for resolving a cluster partition. These processes are initiated when the network failure detection mechanism indicates that a partition has occurred. Each cluster member node is presented with a list of nodes that are currently alive and that can communicate over the cluster network. For example, an original node list may be as follows: (0,1,2,3,4,5,6,7) and the new node list may be the following: (0,1,2,6,7). The new node list indicates that nodes 3,4 and 5 have either failed or are unable to communicate with the remaining nodes over the network. The general steps are for each node to write new data to its NIB area on the shared disk, read the updated NIB area for each node from the shared disk, calculate statistics from the collection of NIB data from each node, determine the member nodes in each cluster partition, and decide on an action for this node to take. Typically the action will be either to continue operating as a member node of the cluster or to cease operating as a member node of the cluster. The partition resolution processes in FIGS. 8–12 are running on each node within the clustered computer system and return either a true or false indication for the node on which the processes are running. A true indication indicates that the node should survive the cluster failure while a false indication indicates that the node should terminate after the cluster failure.

In accordance with a preferred embodiment of the present invention, each node updates its NIB with the nodes that are members of its cluster partition. That updated NIB is written to the shared disk. Each node reads and caches a copy of the CSM and NIB for each cluster member node. Each node will then wait for a period of time specified by a synchronization time value in the CIB. After this period of time, the node will re-read each NIB and compare the cluster generation to the value in the cached NIB that was read first. If the cluster generation number has been incremented, that node is determined to be active. A count of the active nodes and the number of the lowest active node are also determined for each cluster partition. The node count and lowest node number are used to determine the largest partition, break a tie if there are partitions with equal numbers of nodes, and determine which node will update the CSM. If there is a cluster partition with a true majority of cluster node members, that partition will continue to function while nodes in other cluster partitions will terminate their processing. If there is not a true majority cluster partition, then the cluster partition with a plurality of cluster node members will continue processing. If there is no plurality, then one of the largest remaining cluster partition that contains the lowest numbered active node will continue processing. The lowest numbered active node serves as a tie breaker. Nodes in all other cluster partitions will terminate processing. The lowest numbered node in the surviving partition will update the CSM to reflect the change in the clustered computer system membership.

Figure 8:
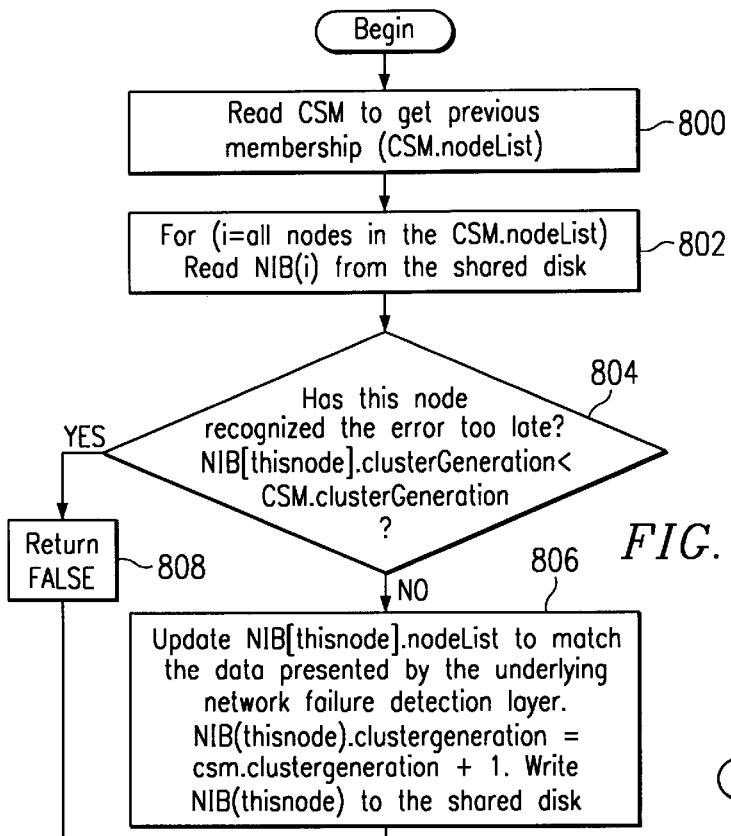
FIG. 8 is a flowchart of a process where upon being notified of a node or network failure, a node will use the shared disk to write new cluster membership data in accordance with a preferred embodiment of the present invention.

In FIG. 8, each node reads the CSM from the shared disk. The CSM contains the official node membership of the cluster. Only those nodes who are represented in the CSM will be considered in the rest of the cluster partition resolution processing. For each node represented in the CSM, its NIB will be read from the shared disk. The cluster resolution algorithm must complete within a designated period of time. A delay in processing by one node must not prevent the cluster partition resolution processing from completing. Therefore, nodes that are delayed in handling a node or network failure indication will be excluded from the cluster partition resolution processing as well. It is important that a node detects if it has been delayed. If such a delay is detected, the node will cease participating in the cluster. Nodes that continue to participate in the algorithms must write an updated NIB block to the shared disk to signal to other nodes that they are actively processing the failure indication.

The detailed process, in accordance with a preferred embodiment of the invention, begins by reading the CSM node list to obtain the previous membership (the CSM.nodeList) in the clustered computer system (step 800). Each NIB (NIB(i)) in the CSM.nodeList is read from the shared disk (step 802). A determination is then made as to whether the current node on which the process is executing has recognized the error too late (step 804). This determination is made by comparing the cluster generation number in the NIB for the current node (NIB[thisnode] .clusterGeneration) to the CSM cluster generation number (CSM.clusterGeneration) as follows: NIB[thisnode] .clusterGeneration<CSM.clusterGeneration. If the node has not recognized the error in the clustered computer system too late, the NIB for the current node is updated to match the data presented by the underlying network failure detection layer, and the cluster generation number in the NIB is incremented so that other nodes will know that the current node is writing new data to the shared disk (step 806). The NIB blocks from the shared disk can be handled as an array of date blocks. Each node's block can be referenced by an index into this array. Thus, NIB[i] would be the NIB for node i. If the current node's number is indicated by a variable "this node", then NIB[this node] would index to the current node's NIB block. NIB[this node].node list indicates a reference to the node list field of the current node's NIB step (806).

With reference again to step 804, if the node has recognized the error in the clustered computer system too late, a false indication is returned (step 808) with the process terminating thereafter. This false indication means that the node will terminate and not provide services after the partition error.

Figure 9A:
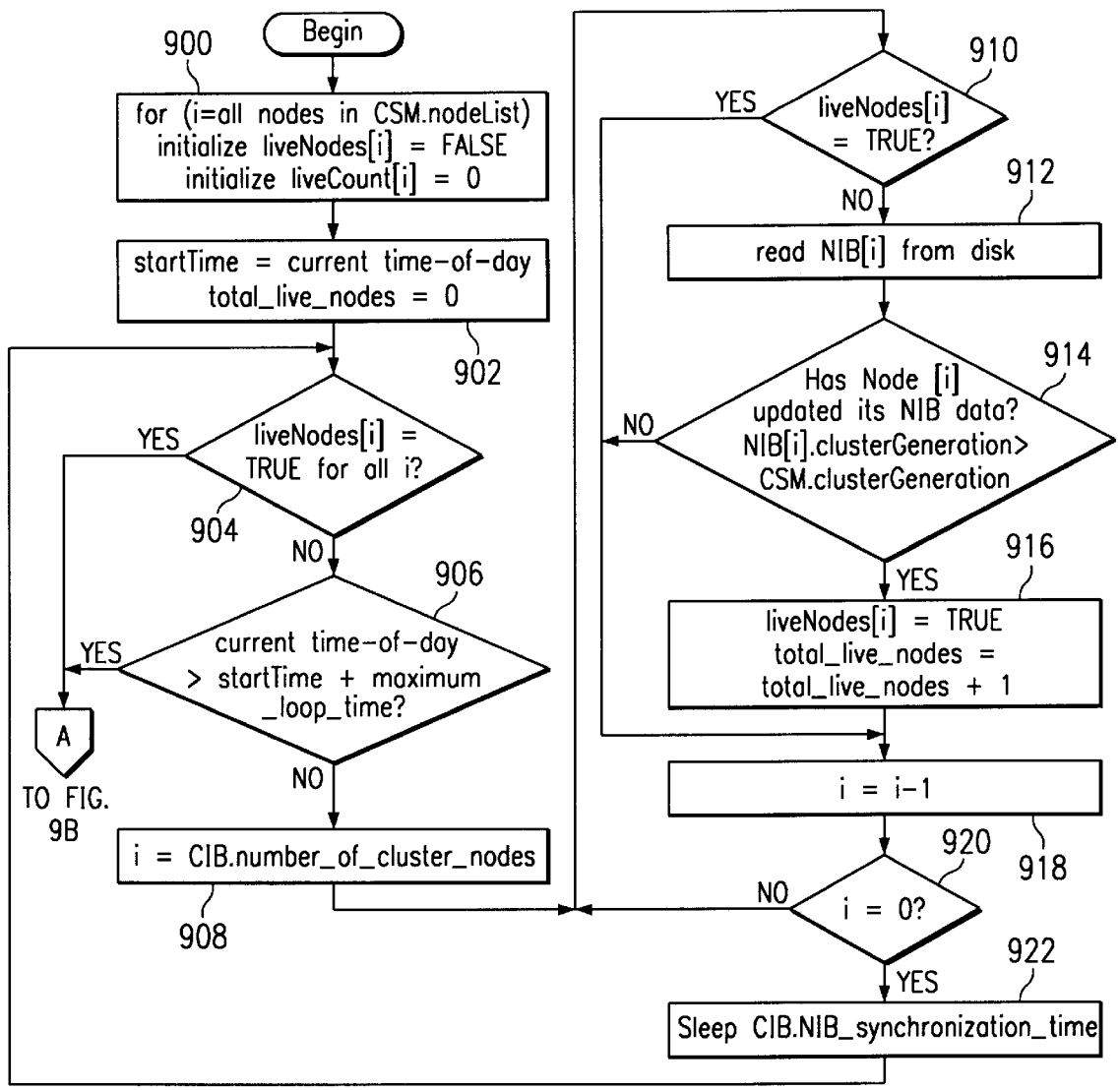
FIG. 9A is a flowchart of a process where upon being notified of a node or network failure, a node will use the shared disk to read the cluster membership data from other nodes in accordance with a preferred embodiment of the present invention.
Figure 9B:
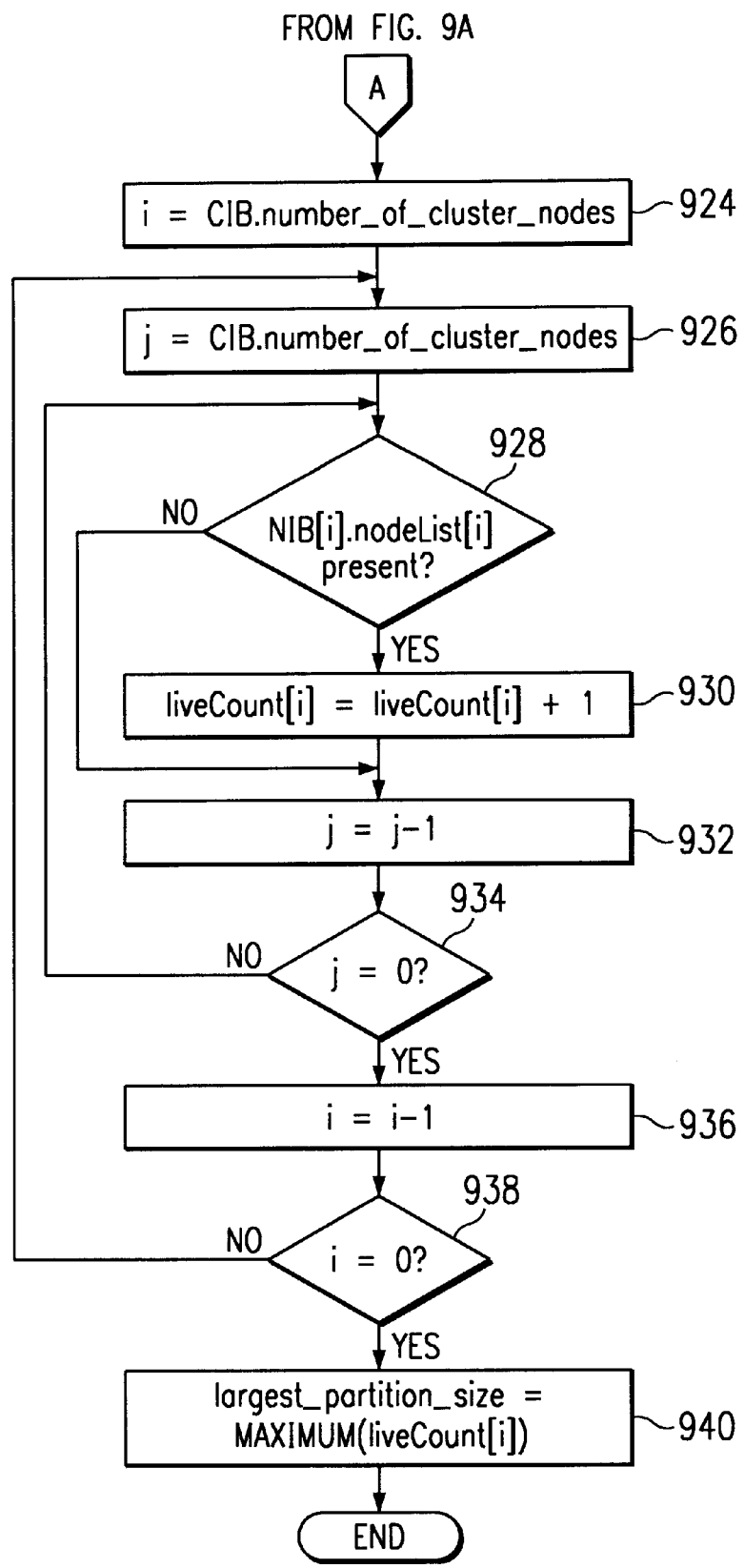
FIG. 9B is a flowchart of a process for calculating statistics from the data each node has written to the shared disk upon being notified of a node or network failure in accordance with a preferred embodiment of the present invention.

FIGS. 9A and 9B depict a flowchart of a process to determine which nodes have written updated data to the shared disk and to gather statistical data for subsequent processing in accordance with a preferred embodiment of the present invention.

Refer to FIG. 9A. Each node must read the updated NIB data from each of the other cluster member nodes. A node detects that it has read an updated NIB by observing that the cluster generation number in the NIB has been incremented. Each node loops until it has either read an updated NIB from each cluster member node or until a predetermined timeout value has been reached. The timeout value ensures that the cluster partition resolution algorithm will not be prevented from completing by nodes that are delayed in writing updated NIB data to the shared disk.

The process begins by initializing statistical counters for each of the nodes in the CSM node list CSM.nodelist (step 900). The process iterates over each of those nodes to determine if each node has updated its NIB data. The iteration will continue until either all nodes have updated their NIB data and been marked live (liveNodes[i] is TRUE for all i(step 904)) or until a timeout value had been reached (step 906). This timeout value in the depicted example is met if the current time-of-day is greater than the start time plus the maximum loop time.

This iterative process is now described in more detail. An outer loop checks if either of the exit conditions are met (steps 904 and 906). These checks will be FALSE the first time through since these values have just been initialized (step 900). When the checks are false in both steps 904 and 906, the variable i is equal to the CIB number of cluster nodes (step 908). An inner loop iterates over each node (step 910) and sets the exit conditions. A check is made to see if node [i] has been recorded as live (step 910). If node [i] has not been recorded as a live node, the node's NIB (NIB[i]), is read from the shared resource (step 912), and it's NIB[i] .clusterGeneration value is compared to the master CSM- .clusterGeneration value (step 914). If the NIB value is greater than the CSM value, then the node has written updated NIB data. This node is marked as alive and the total number of live nodes is incremented (step 916). The node is marked as alive by liveNodes[i]=TRUE and the total number of live nodes is incremented as follows: total_live_ nodes=total_live_nodes+1. If the NIB value is not greater than the CSM value, then the node has not yet written updated NIB data. The counter i is then decremented (step 918) and a determination is made as to whether i is equal to zero (step 920). Step 920 is used to determine whether all of the nodes have been processed. After looping through the nodes, the process sleeps or delays for a time equal to the CIB.NIB_synchronization_time (step 922). After the delay, control begins at the top of the outer loop where the exit conditions are again checked (step 904).

Processing then continues according to the a preferred embodiment of the invention as depicted in FIG. 9B. After a node has read the updated NIB blocks for the other cluster member nodes, it calculates statistics from that data as depicted in FIG. 9B. The statistics calculated include the following: the number of nodes each node has determined to be alive and the size of the largest cluster partition. The number of nodes each node determines to be alive is the size of that node's cluster partition. This figure depicts a flowchart in which several statistical counters are updated. The process is composed of two nested loops, which are set up by setting counter i equal to the CIB number of cluster nodes (step 924) and setting counter j equal to the CIB number of cluster nodes (step 926). For each node [i], the nodeList[j] is scanned (step 928). The determination in step 928 is made as follows: NIB[i].nodeList[j] present? If a node is present in the nodeList[j], then liveCount[i] is incremented (step 930). Thereafter, counter j is decremented (step 932) and a determination is made as to whether j is equal to zero (step 934). If j is not equal to zero, the process returns to step 928. Otherwise, i is decremented (step 936). Then, a determination is made as to whether i is equal to zero (step 938). If i is not equal to zero, the process returns to step 926. The result is that liveCount[i] represents the number of nodes that node[i] is reporting as alive and a member of its partition. After the nodeLists for all nodes have been scanned as indicated by i and j being equal to zero, the size of the largest partition is calculated to be the maximum of the liveCount[i] values (step 940). This calculation is performed as follows: largest_partition_size=MAXIMUM (liveCount[i]).

Figure 10:
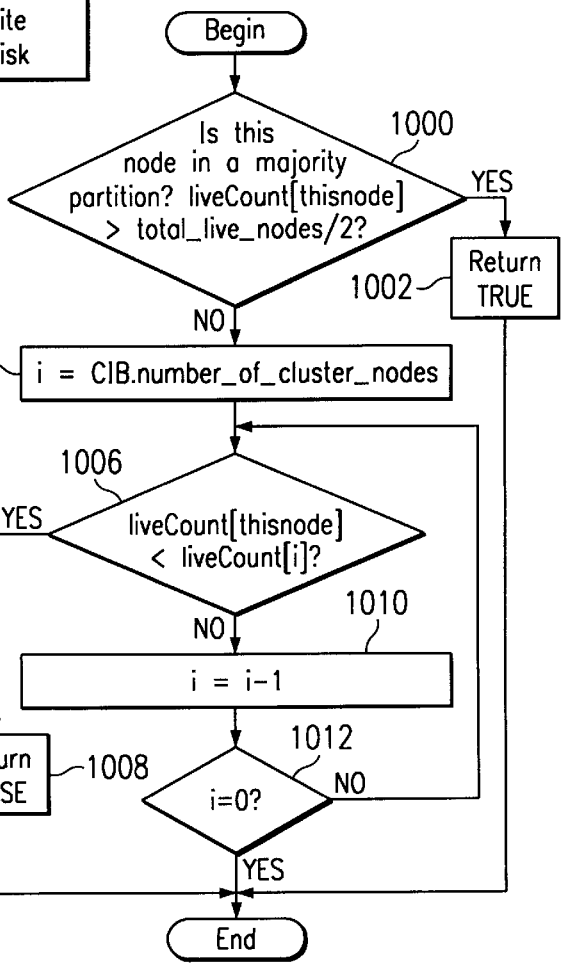
FIG. 10 is a flowchart of a process to determine if a node is in a cluster partition that contains a majority or a minority of the total cluster member nodes in accordance with a preferred embodiment of the present invention.

With reference next to FIG. 10, a flowchart of a process for analyzing data collected from all of the nodes is depicted in accordance with a preferred embodiment of the present invention. The statistical data updated in FIGS. 9A and 9B are analyzed to determine whether the node on which the process is executing is in a strict majority partition or in a strict minority partition. This determination can also be based on some metric other than the number of nodes, such as node speed or capacity.

If there is a cluster partition that contains a true majority of the cluster member nodes, then that cluster partition is the largest cluster partition. Conversely, if a node is a member of a cluster partition which is smaller than some other cluster partition of which it is not a member, then this node has determined that it is in a cluster partition with a minority number of nodes.

It is possible that there is no cluster partition that contains a true majority of the cluster member nodes. In such a case, the algorithm looks for the cluster partition with a plurality of nodes. That is, it looks for the cluster partition with the most number of nodes that is not a true majority. If there is not such a partition, then of the partitions with the most number of nodes, the partition with the lowest numbered node is selected. In FIG. 10, liveCount[i] represents the number of nodes present in NIB[i].nodeLists, and total_live_nodes represents the total number of nodes that have written updated data to the shared disk during the processes depicted in FIGS. 9A and 9B. A check is made to see if the node the process is running on is in a strict majority partition (step 1000). This is determined by the test liveCount (thisnode)>total_live_nodes/2. If this determination in step 1000 is true, the process returns TRUE (step 1002). If this determination is false, a counter i is set equal to the CIB number of cluster nodes (step 1004). A check is then made to see if some other node belongs to a larger partition than the current node (step 1006). This check is made by seeing if liveCount(thisnode)<liveCount[i] for any other node. If this condition is true, then FALSE is returned (step 1008) with the process terminating thereafter. If this condition is false, the counter i is decremented (step 1010) and a determination is made as to whether i is equal to zero (step 1012). If i is equal to zero, the process terminates. Otherwise, the process returns to step 1006 as described above. When the process in FIG. 10 terminates, processing continues as described with respect to FIG. 11 below.

Figure 11:
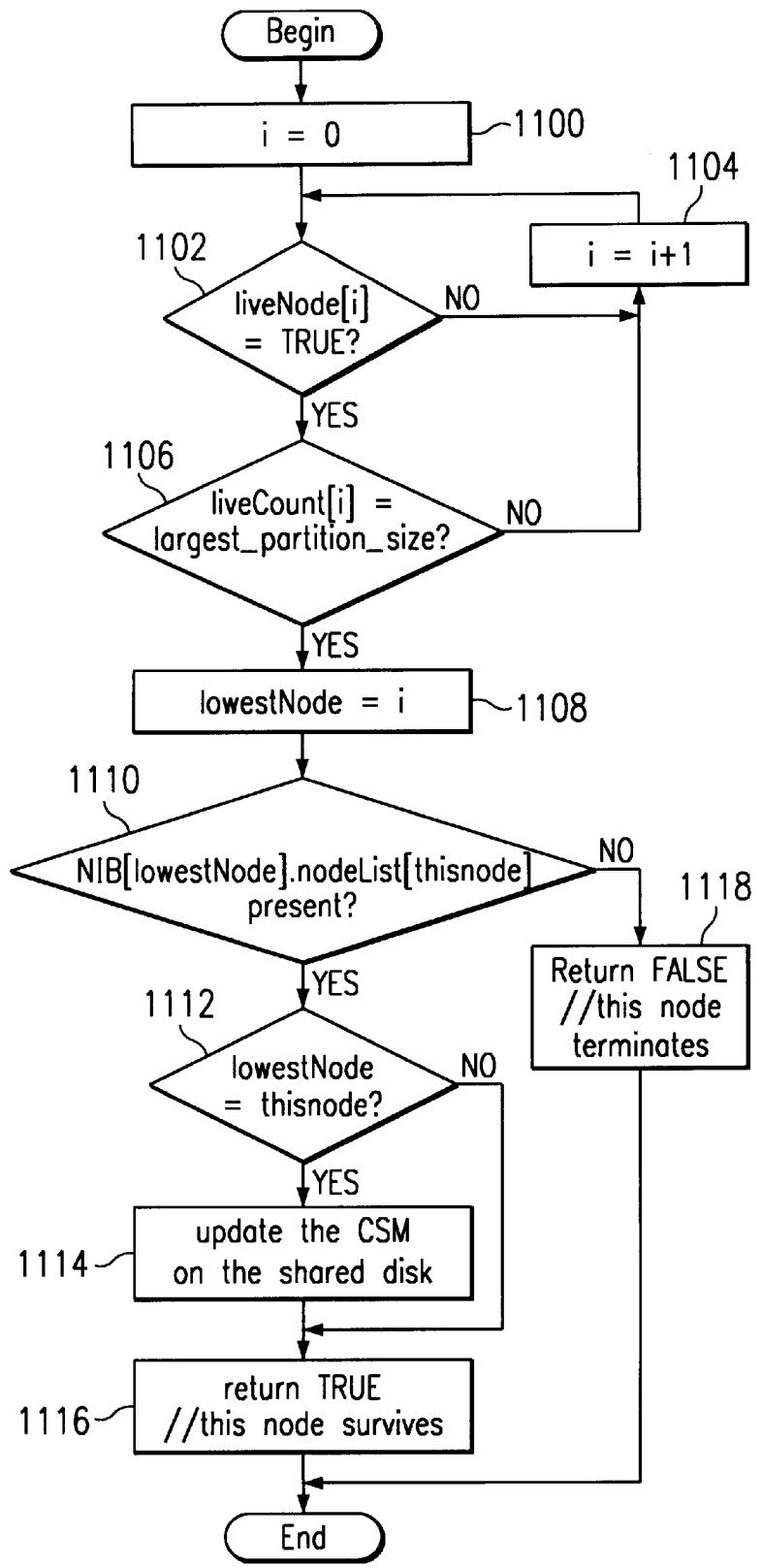
FIG. 11 is a flowchart for a process to determine if a node is in a cluster partition that contains a plurality of the total cluster member nodes in accordance with a preferred embodiment of the present invention.

FIG. 11 depicts a flowchart of a process for determining if a node is in the largest sub-partition with the lowest numbered node in accordance with a preferred embodiment of the present invention. This process is used when a node is in a sub-partition that is neither a strict majority nor a strict minority partition. There may be several smaller partitions, only the largest of which should continue running. If several smaller partitions are present that are the same size, then as a tie-breaker, the partition with the lowest numbered node will continue running.

Processing begins by starting a loop index at 0 (step 1100). A determination is then made as to whether the node is alive. This determination is made by the test liveNode[i] =TRUE (step 1102). If that node is not alive, then the node is skipped in this loop. This is accomplished by incrementing the counter i (step 1104) with the process then returning to step 1102. If that node is alive, a check is made to see if the node's livecount value is equal to the largest_partition_size (step 1106). This determination is made as follows: liveCount[i]=largest_partition_size? Largest_partition_size was calculated in FIG. 9B. If the node's live count value is not equal to largest partition size, the process then increments the counter i in step 1104 and returns to step 1102. The first node found that meets both of these conditions is the lowest numbered node by setting lowestNode equal to i (step 1108).

A check is then made to determine if the current node is a member of the lowest numbered node's partition (step 1110). This determination is made as follows: NIB [lowestNode].nodeList[thisnode] present? If this is the case, an additional check is made to see if the current node is in fact the lowest numbered node by determining if lowestNode =thisnode (step 1112)? If this is true, then the current node writes the updated CSM to the shared disk (step 1114). Whether or not the current node is the lowest numbered node, the process returns TRUE (step 1116). With reference again to step 1110, if the current node is not a member of the lowest numbered node's partition, FALSE is returned (step 1118) with the process terminating thereafter. With reference back to step 1112, if the lowest node is not set equal to this node, the process then proceeds to step 1116 as described above.

Figure 12:
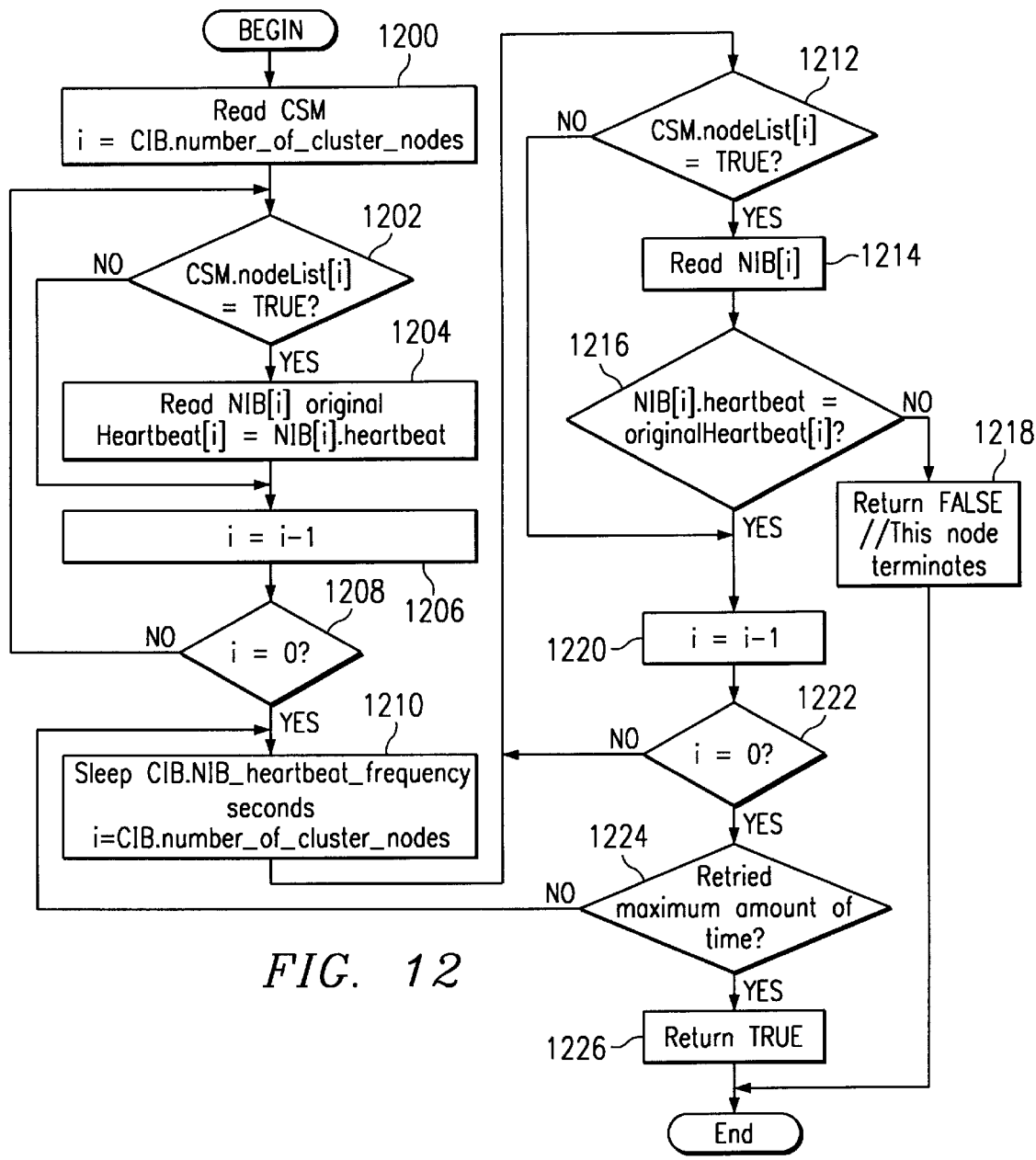
FIG. 12 is a flowchart of a process for analyzing data collected from all the nodes to prevent a new cluster partition from being formed in accordance with a preferred embodiment of the present invention.

With reference now to FIG. 12, the present invention also prevents a previously disconnected node from starting up and forming its own partition. When a node attempts to join a cluster, the underlying network failure detection layer indicates which other nodes are already live members of the cluster. If the underlying layer indicates that there are no live members in the cluster, this must be validated to determine if the indication is correct or if the live members are not visible due to a failed network. This process is depicted in the flowchart in FIG. 12.

The process begins by reading the CSM to retrieve the list of nodes most recently recorded as members of the cluster and set i equal to the CIB number of cluster nodes (step 1200). A determination is made as to whether node[i] is present in CSM.nodeList (step 1202). If node [i] is present, its NIB is read from the disk and its NIB.heartbeat value is saved (step 1204). Thereafter, the counter i is decremented (step 1206) and a determination is made as to whether i is equal to zero (step 1208). If i is not equal to zero, the process returns to step 1202. Such an indication means that not all of the nodes present in the CSM.nodeList have been processed. If all the nodes have been processed, the process then sleeps for an amount of time equal to the CIB.NIB_heartbeat_frequency value (step 1210). The same list of NIB blocks is again read from disk. This is performed by determining whether CSM.nodeList [i] is TRUE (step 1212). If the determination is true, the NIB is read for the node (step 1214). A determination is made as to whether the value of the NIB.heartbeat has changed for a particular node (step 1216). This determination is made by the following test NIB[i].heartbeat=originalHeartbeat[i]. If the value of NIB-.heartbeat has changed for any of these nodes, this indicates that some other nodes have already formed a live cluster. A FALSE indication is returned (step 1218), and the process terminates thereafter. If the NIB.heartbeat has not changed, then the counter i is decremented (step 1220). Thereafter, a determination is made as to whether i is equal to zero (step 1222). If i is not equal to zero, the process returns to step 1212. The steps to check for a changed NIB.heartbeat value are repeated an arbitrary number of times by determining whether a maximum retry time has been reached (step 1224). This arbitrary time is selected such that other nodes will have had ample time to write an updated NIB. This time may take into account other processing that might be occurring on those modes and that might delay the heartbeats to disk. If the maximum retry time has not been reached, the process then returns to step 1210 as described above. If on the other hand, the maximum retry time is reached without detecting a changed NIB.heartbeat value, then TRUE is returned (step 1226) and processing continues to form the new cluster.

Figure 13A:
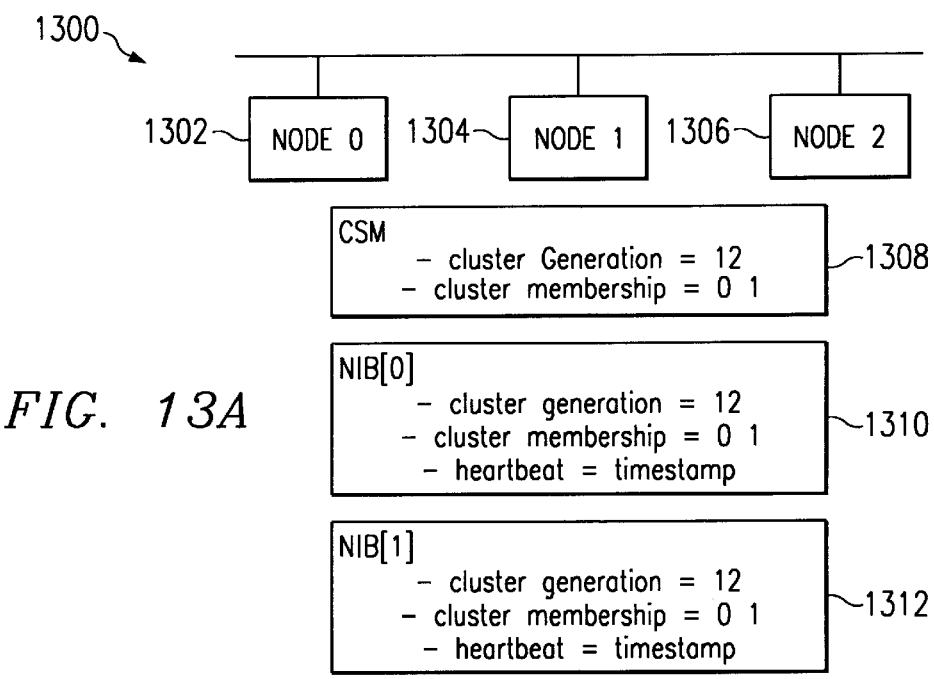
FIGS. 13A and 13B illustrate an example of a node joining a clustered computer system in accordance with a preferred embodiment of the present invention.
Figure 13B:
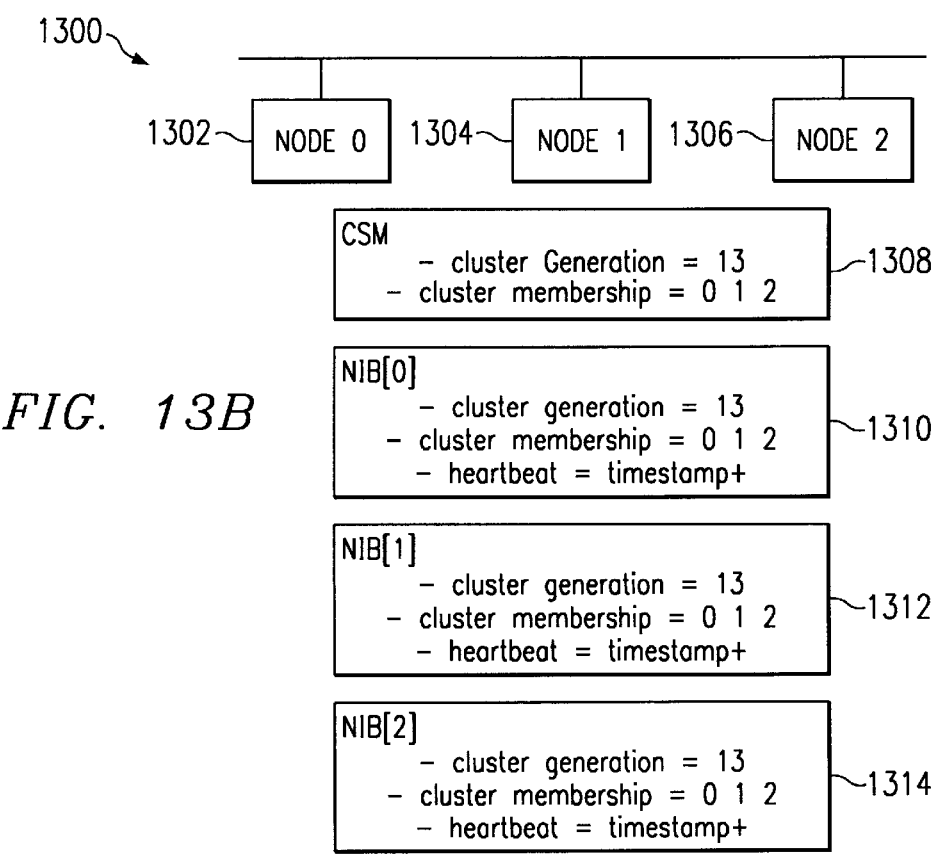

With reference now to FIGS. 13A and 13B, an example of a node joining a clustered computer system is depicted in accordance with a preferred embodiment of the present invention. In FIG. 13A, clustered computer system 1300 contains node 0 1302 and node 1 1304. Node 2 1306 is a node that is to join clustered computer system 1300. CSM 1308 shows a cluster generation number of 12 and a cluster membership of 0 and 1 for node 0 1302 and node 1 1304, respectively. NIB 1310 is associated with node 0 1302 while NIB 1312 is associated node 1 (1304). In the depicted example, node 0 1302 and node 1 1304 are notified of a join request to join node 2 1306. The current members perform any authority/approval processing normally employed in clustered computer systems. Once node 2 1306 is allowed to join clustered computer system 1300, all of the nodes retrieve CSM 1308. The cluster generation number in the NIBs are incremented and all of the nodes add the new node to their NIB membership list. In the depicted example, the CSM is updated by the lowest numbered member node. Thus, when node 1306 joins clustered computer system 1300, the cluster generation numbers change as can be seen in CSM 1308, NIB 1310, and NIB 1312 in FIG. 13B. In addition, the cluster membership now includes 0,1, and 2 with 2 being associated with node 2 1306. NIB 1314 is now present and is associated with node 2 1306. "Heartbeat= timestamp+" indicates that this value has also been increased in each of the NIBs.

Figure 14C:
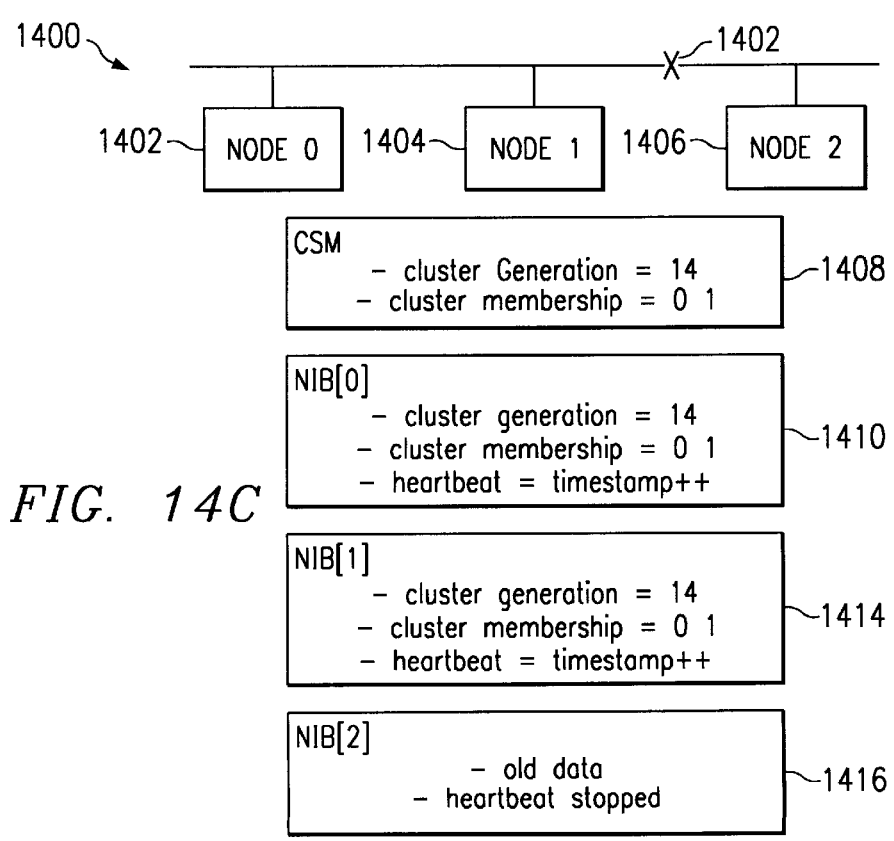
FIGS. 14A–14C illustrate an example of a cluster partition resolution after a network failure in accordance with a preferred embodiment of the present invention.
Figure 14A:
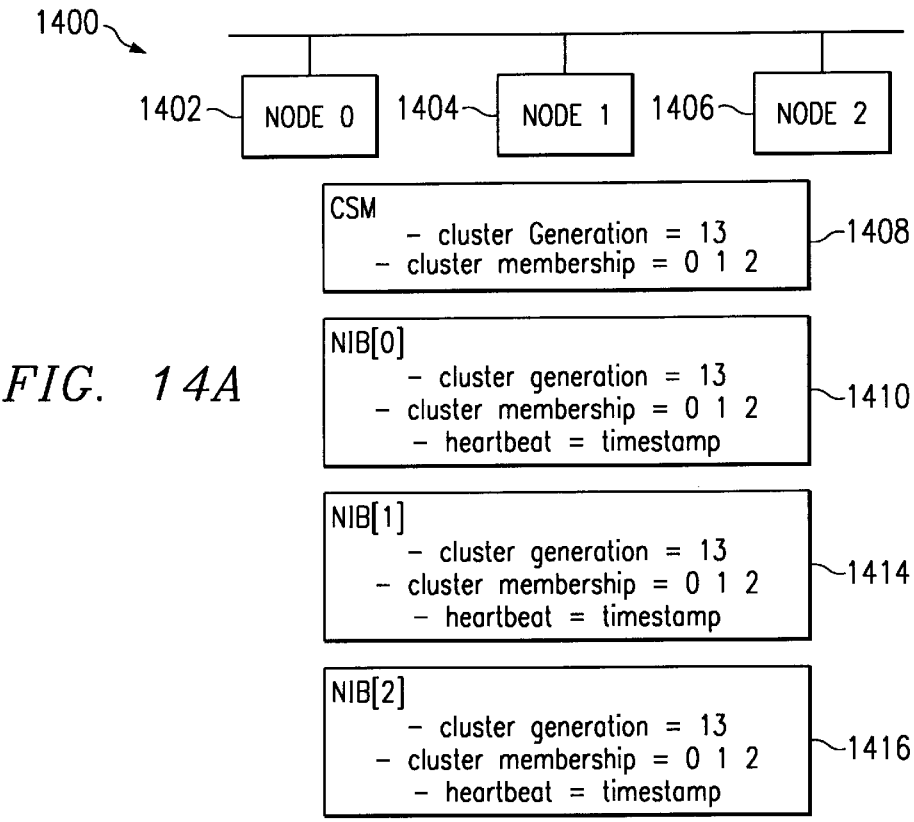
Figure 14B:
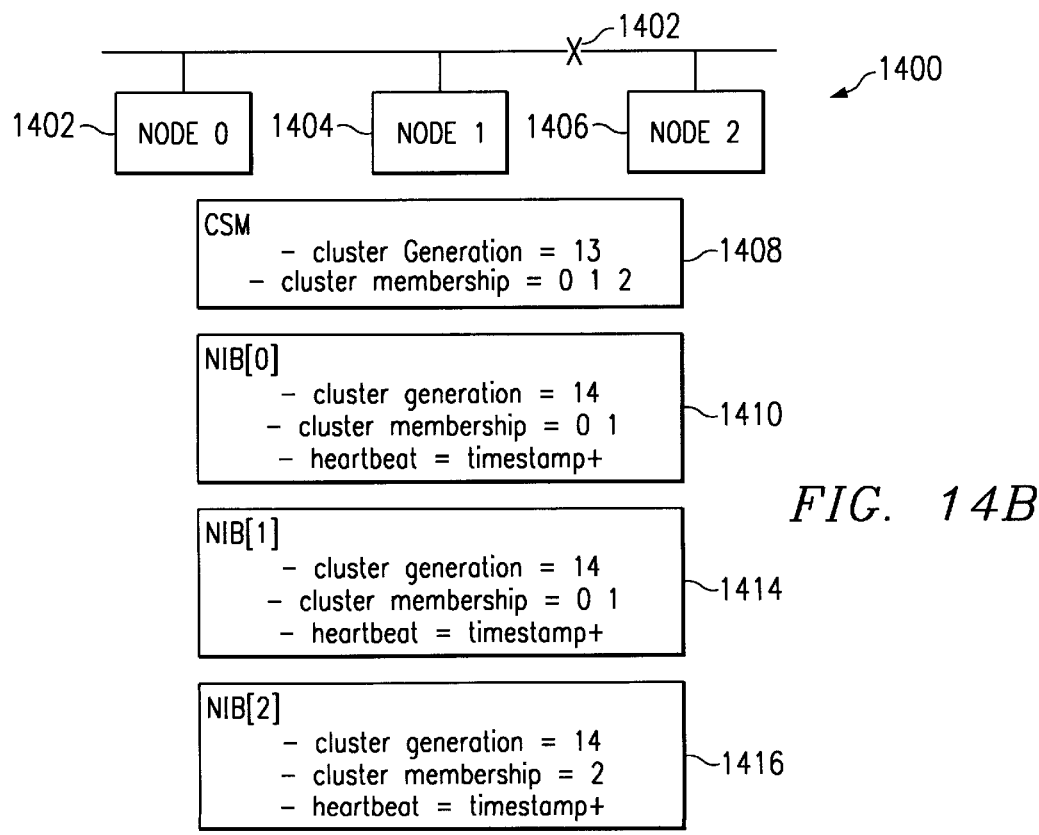

Turning next to FIGS. 14A–14C, an illustration of partition resolution after network failure is depicted in accordance with a preferred embodiment of the present invention. In FIG. 14A, clustered computer system 1400 includes node 0 1402, node 1 1404, and node 2 1406. CSM 1408 is the cluster state map for clustered computer system 1400 and NIBs 1410, 1414, and 1416, are associated with node 0 1402, node 1 1404, and node 2 1406, respectively. In FIG. 14B, a failure in clustered computer system 1400 has occurred with a break in network 1402 causing a partition of clustered computer system 1400 in which node 0 1402 and node 1 1404 form one cluster partition while node 2 1406 forms another cluster partition. The two cluster partitions are unable to communicate with each other. As a result of this failure, all of the nodes in clustered computer system 1400 are notified of the loss of communication. The failure is resolved using the processes described above in FIGS. 8–12.

As a result, all of the nodes write data to their NIBs as can be seen in FIG. 14B. The cluster generation numbers in NIBs 1410, 1414, and 1416 have been incremented such that the cluster generation numbers in these NIBs are greater than the cluster generation number in CSM 1408. This incrementing of the cluster generation number indicates to other nodes that new data is present in the NIB and that the node writing the NIB has recognized the failure in clustered computer system 1400. In addition, each node updates the node list to indicate members with which the node can communicate as can be seen in NIBs 1410, 1414, and 1416. "Heartbeat=timestamp+" indicates that this value has been increased from the value in FIG. 14A. All of the nodes analyze NIB data collected from all other nodes. In the depicted example, node 0 1402 and node 1 1404 survive and continue processing requests sent to clustered computer system 1400 while node 2 1406 stops processing requests and leaves the cluster as shown in FIG. 14C. In FIG. 14C, when node 2 1406 leaves, data in NIB 1416 becomes old data and the heartbeat has stopped, which is indicated by an absence in a change in the timestamp. "Heartbeat= timestamp++" indicates that this value has been increased from the value in FIG. 14B.

Although the depicted example in FIGS. 14A–14C illustrates resolving partitions involving three nodes, the processes of the present invention may be applied to clusters containing two to N nodes. In addition, the present invention allows for the use of tie breaking algorithms for the situation in which a partition of the clustered computer system creates two partitions each having an equal number of nodes. In addition, the processes of the present invention may be applied to a partition that results in the clustered computer system being partitioned into two or more parts.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a random-access memory, CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application and to enable others of ordinary skill in the art to understand the invention for various embodiments with various modifications as are suited to the particular use contemplated.

What is claimed is:

1. A method in a clustered computer system for resolving a partition of nodes in the clustered computer system, the method comprising the computer implemented steps of:

monitoring for a failure of a network connecting nodes within the clustered computer system;

writing information about the nodes present within the clustered computer system to a data structure in a shared resource;

responsive to detecting a partition of the nodes in the clustered computer system, writing data to the data structure, wherein the data indicates that a node is functioning after the partition;

retrieving information about the nodes from a shared resource in response to a detection of the partition of the nodes in the clustered computer system; and resolving the partition of the clustered computer system using the information about the nodes.

2. The method of claim 1, wherein the resolving step includes:

identifying a partition having the greatest number of nodes; and shutting down nodes outside of the partition.

3. The method of claim 1, wherein the shared resource is a hard disk drive.

4. A method in a computer for handling a partition of a server system, wherein the computer is part of a number of computers located within the server system, the method comprising:

periodically writing data into a data structure in a shared resource, wherein the data provides a status of the computer and wherein a data structure is associated with each computer in the server system;

monitoring for a partition of the server system;

reading all data structures located in the shared resource in response to detecting a partition of the server system; and determining whether the computer is in a partition containing a largest number of computers.

5. The method of claim 4 further comprising:

remaining active in response to a determination that the computer is in the partition containing the largest number of computers.

6. The method of claim 4 further comprising:

shutting down the computer in response to a determination that the computer is outside of the partition containing the largest number of computers.

7. The method of claim 4, wherein the shared resource is a hard disk drive.

8. The method of claim 4, wherein the data structure is a node information block containing cluster status data of other computers in the server system.

9. A clustered computer system for processing a partition of nodes in the clustered computer system, the clustered computer system comprising:

monitoring means for monitoring a failure of a network connecting nodes within the clustered computer system;

first writing means for storing information about the nodes present within the clustered computer system to a data structure in a shared resource;

second writing means, responsive to detecting a partition of the nodes in the clustered computer system, for writing data to the data structure, wherein the data indicates that a node is functioning after the partition;

retrieving means for retrieving information about the nodes from a shared resource in response to a detection of the partition of the nodes in the clustered computer system; and resolving, means for resolving the partition of the clustered computer system using the information about the nodes.

10. The clustered computer system of claim 9, wherein the resolving means includes:

identifying means for identifying a partition having a greatest number of nodes; and means for shutting down nodes outside of the partition.

11. The clustered computer system of claim 9, wherein the shared resource is a hard disk drive.

12. A clustered computer system comprising:

a network;

a plurality of computers connected to the network;

a shared resource, wherein the shared resource is connected to the plurality of computers;

a plurality of data structures, wherein each of the plurality of data structures is associated with a computer within the plurality of computers, wherein the plurality of computers periodically update the data structures to reflect membership in the clustered computer system;

wherein each of the plurality of computers includes:

detection means for detecting a partition of the clustered computer system;

reading means for reading data the plurality of data structures in the computer in the shared resource; and determination means for determining whether the computer is to survive.

13. The clustered computer system of claim 12, wherein the shared resource is a direct access storage device.

14. The clustered computer system of claim 12, wherein the shared resource is a hard disk drive.

15. The clustered computer system of claim 12, wherein the shared resource is a random access memory.

16. A method of processing partitions in a computer cluster system, wherein the computer cluster system includes a plurality of computers connected to each other by a network to form a cluster network topology and a shared data storage device as an additional means of communication, the method comprising the computer implemented steps of:

writing, by each of the plurality of computers, a view of the cluster network topology to a storage location on the shared data storage device, wherein a plurality of views are written to the data storage device;

analyzing, by each of the plurality of computers, views as written to the shared data storage device by other computers within the plurality of computers to make an analysis of any partition present in the clustered computer system; and determining of how to resolve a partitioned cluster.

17. The method of claim 16, wherein the analysis includes a determination of a number and a membership composition of any partitions present in the clustered computer system.

18. The method of claim 16, wherein each computer within the plurality of computers is assigned a set of storage locations on the shared data storage device to form a set of assigned storage locations.

19. The method of claim 18, wherein each computer within the plurality of computers independently updates the assigned set of storage location on the shared data storage device.

20. The method of claim 16, wherein the shared data storage device is connected to the plurality of computers using a memory channel.

21. The method of claim 16, wherein the shared data storage device is connected to the plurality of computers in a clustered computer system using a communications network.

22. The method of claim 16, wherein the shared storage device is connected to the plurality of computers using a disk interconnect.

23. The method of claim 16, wherein the cluster network topology view of the cluster membership is maintained on the shared data storage device.

24. The method of claim 16, wherein cluster version values are maintained on the shared data storage device.

25. The method of claim 24, wherein the indication includes a special data value written to the shared data storage device including a counter.

26. The method of claim 16, wherein a computer within the plurality of computers periodically updates its network topology view to provide an indication to other computers within plurality of computers that the computer is functioning.

27. The method of claim 16, wherein multiple shared data storage devices are employed.

28. The method of claim 16, wherein a device is used to coordinate reads and writes to the shared data storage device and the device includes a mutual exclusion mechanism used to coordinate reads and writes to the shared storage device.

29. The method of claim 16, wherein status information is stored in the shared data storage device and wherein each computer within the plurality of computers retains a local copy of status information on the shared storage device and uses the local copy of the status information to detect updates.

30. A method of resolving multiple network partitions in a clustered computer network having a cluster network topology, wherein the clustered computer network includes a plurality of computers, at least one network interconnection, and a shared data storage device as an additional means of communication, the method comprising the computer implemented steps of:

upon notification that a cluster network topology change has occurred, updating, by each computer within the plurality of computers, a view of the cluster network topology to a storage location on the shared data storage device;

reading, by each computer within the plurality of computers, updated network topology views written by other computers within the plurality of computers from the shared device;

making an independent determination, by each computer within the plurality of computers, of a desired cluster membership based on data read from the shared data storage device; and performing actions to achieve the desired cluster membership.

31. The method of claim 30, wherein a computer within the plurality of computers coordinates the independent determination of a desired cluster membership by checking to see that other computers within the plurality of computers have updated cluster topology version information on the shared data storage device.

32. The method of claim 30, wherein a computer within the plurality of computers makes an independent decision to cease participation in the plurality of computers.

33. The method as in claim 30, wherein a policy is implemented allowing only a single partition to remain active in the computer cluster system.

34. The method of claim 30, wherein a policy is implemented allowing more than one partition to remain active in the clustered computer system.

35. A computer program product in a computer readable medium for managing a clustered computer system, the computer program product comprising:

first instructions for monitoring for a failure of a network connecting nodes within the clustered computer system;

second instructions for writing information about nodes present within the clustered computer system to a data structure in a shared resource;

third instructions, responsive to detecting a partition of the clustered computer system, for writing data to the data structure, wherein the data indicates that a node is functioning after the partition; and fourth instructions, responsive to a detection of the partition of the clustered computer system, for retrieving information for a shared resource.

* * * * *

UNITED STATES PATENT AND TRADEMARK OFFICE
CERTIFICATE OF CORRECTION

PATENT NO.   : 6,363,495 B1
DATED        : March 26, 2002
INVENTOR(S)  : MacKenzie et al.

It is certified that error appears in the above-identified patent and that said Letters Patent is hereby corrected as shown below:

Column 19,
Line 64, delete "resolving, means" and insert -- resolving means --.

Signed and Sealed this

Sixth Day of May, 2003

JAMES E. ROGAN
*Director of the United States Patent and Trademark Office*